United States Patent [19]

Nishiwaki

[11] 4,256,253
[45] Mar. 17, 1981

[54] FRICTION PRESSURE WELDING METHOD

[75] Inventor: Takeshi Nishiwaki, Satte, Japan

[73] Assignee: Akebono Brake Industry Company, Ltd, Tokyo, Japan

[21] Appl. No.: 50,633

[22] Filed: Jun. 21, 1979

[30] Foreign Application Priority Data

Jun. 28, 1978 [JP] Japan .................................. 53-78320

[51] Int. Cl.³ .............................................. B23K 19/02
[52] U.S. Cl. ........................................ 228/112; 228/2; 228/265
[58] Field of Search ................ 228/112, 113, 114, 265, 228/2

[56] References Cited

U.S. PATENT DOCUMENTS

| 3,452,421 | 7/1969 | Cheng et al. | 228/112 |
| 3,452,914 | 7/1969 | Oberle et al. | 228/2 |
| 4,074,449 | 2/1978 | Lanz et al. | 228/114 |

FOREIGN PATENT DOCUMENTS 46-018529   3/1971   Japan ........................................ 228/112

Primary Examiner—Richard B. Lazarus
Attorney, Agent, or Firm—Armstrong, Nikaido, Marmelstein & Kubovcik

[57] ABSTRACT

A friction pressure welding method in which, for a friction pressure welding between a pin and a recess of a support, the recess is arranged to have an inner diameter slightly larger than an outer diameter of the pin and a cap nut fitted to a collet chuck of a friction pressure welding machine is provided with an extension at a front thereof so as to control a curl projecting from an end surface of the pin at a certain height during operation of the friction pressure welding such that edges produced on the pin are forcibly pressed onto the recess and a welding area between the curl portion and the recess is increased, thereby enhancing a fatigue strength of the joint portion and increasing a strength against vibration exceedingly.

2 Claims, 4 Drawing Figures

FRICTION PRESSURE WELDING METHOD

DETAILED DESCRIPTION OF THE INVENTION

The present invention relates to a friction pressure welding method for a pillar-shaped pin into a recess formed by a spot facing provided on an opposite material, particularly for controlling a height of a curl projecting from an end surface of the pin out of the recess and enhancing a strength against vibration of a joint between the pin and the opposite material.

Further details and advantages of the invention will become apparent from the following description of a preferred embodiment on a disc brake with the accompanying drawings.

Figure 1:
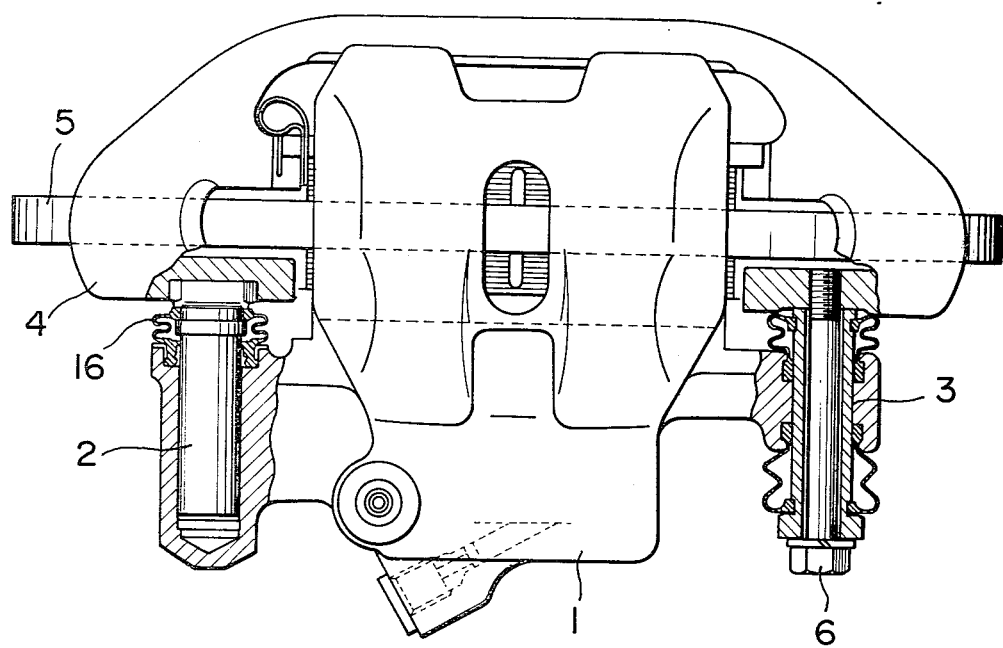
FIG. 1 illustrates a plan view partly in section of a disc brake.

As shown in FIG. 1, a disc brake is generally provided with a caliper 1 which is slidably supported by a support 4 through two guide pins 2 and 3 and is incorporated with a cylinder therein for operating friction pads to both sides of a disc rotor 5 in order to effect a braking operation. The guide pin 3 is fastened to the support 4 so as to produce a frictional force, while the guide pin 2 is directly pressed onto the support 4 by means of a pressure welding.

Figure 2:
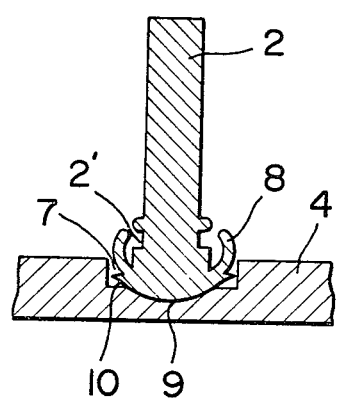
FIG. 2 is a sectional view illustrating a state of a guide pin being welded onto a support by a conventional friction pressure welding method.

The pressure welding of the guide pin 2 to the support 4 has conventionally been carried out in an arrangement that a recess 7 of a considerably large diameter than an outer diameter of the guide pin 2 is provided on the support 4 as shown in FIG. 2 and then the guide pin 2 is revolved and pressed onto a bottom surface of the recess 7 by a pressure welding machine.

In the conventional method of the friction pressure welding, the recess 7 formed on the support 4 has been provided with an inner diameter considerably larger than the outer diameter of the guide pin 2 and with no means of checking the curl 8 projecting from the end surface of the guide pin 2 during operation of the friction pressure welding such that the curl portion 8 projects greatly to the outside of the recess 7 and edges 10 are produced on a circumference of a joint surface 9 between the guide pin 2 and the support 4 as indicated in FIG. 2.

Therefore, the conventional method of the friction pressure welding possesses the following shortcomings:

1. When the curl 8 projects too high, a boot groove 2' of the guide pin 2 is covered by the curl 8 and an end of a boot 16 protecting a sliding portion of the guide pin 2 can not be fitted to the groove 2'.

2. In a vibration test, a stress concentration may occur at the edges 10 on the circumference of the joint surface 9 between the guide pin 2 and the support 4 and produce cracks liable to spread to a destruction.

The present invention is directed to solve those problems. In a friction pressure welding machine, when a guide pin clamped by a collet chuck of the machine is frictionally pressed onto a bottom surface of a recess provided on a caliper support, an inner diameter of the recess is arranged to be slightly larger than an outer diameter of the guide pin and a cap nut of the collet chuck is provided with an extension on the front thereof by which a curl projecting from an end surface of the guide pin to outside of the recess is checked in such a manner that the curl portion is frictionally pressed onto an inner surface formed by a spot facing to complete an expected effect.

The present invention, therefore, features in an advantageous arrangement that the extension provided on the front of the cap nut checks the curl projecting from the guide pin so as to control the projection at a certain height.

Figure 3:
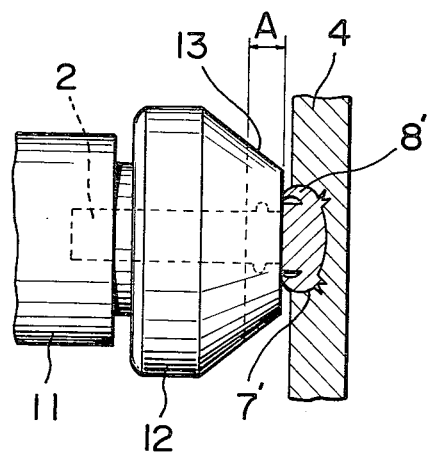
FIG. 3 is a sectional view illustrating a state of the guide pin being welded onto the support by a friction pressure welding machine used in the present invention.

An embodiment of this invention is described as follows. As indicated in FIG. 3, a guide pin 2 is clamped by a cap nut 12 of a collet chuck 11 in a friction pressure welding machine and welded onto a bottom surface of a recess 7' provided on a support 4 in an arrangement that an inner diameter of the recess 7' is slightly larger than an outer diameter of the guide pin 4 and a front of the cap nut 12 is provided with an extension 13 of thickness A which checks a curl portion 8' projecting from an end surface of the guide pin 2 to outside of the recess 7' such that the curl portion 8' is welded onto an inner surface of the recess 7' during operation of the friction pressure welding.

Figure 4:
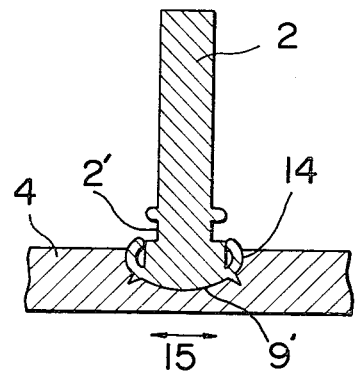
FIG. 4 is a sectional view illustrating a state of the guide pin being welded onto the support through a friction pressure welding method of this invention.

Thus, the friction pressure welding method of the present invention proposes the guide pin 2 being welded onto the support 4 in a state of components as shown in FIG. 4.

In other words, according to this invention, since the inner diameter of the recess 7' is slightly larger than the outer diameter of the guide pin 2 and the cap nut 12 is provided with the extension 13, the projection of the curl portion 8' is checked so as to control the curl portion 8' at a certain height such that the edges 10 produced in the conventional pressure welding method are forcibly pushed into the recess 7' to disappear and further the curl portion 8' is frictionally pressed onto an inner surface 14 of the recess 7'.

The effects of the friction pressure welding method of the present invention are summarized as listed below.

1. In relation to the construction of the disc brake as indicated in FIG. 1, a force applied to the guide pin 2 is mainly a force in parallel with the disc rotor 5 as in a direction of an arrow 15 of FIG. 4 and, in this invention, the curl portion 8' is forcibly pressed onto the inner surface 14 of the recess 7' so as to allow the inner surface 14 receive the force applied on the guide pin 2 in such a manner that a shearing force generated on a joint surface 9' between the guide pin 2 and the bottom surface of the recess 7' is relieved, thereby enhancing a fatigue strength of the joint portion very effectively.

2. In this invention, the curl portion 8' is frictionally welded on the inner surface 14 of the recess 7' with a result of increasing a welding area in comparison with that of the conventional method, thereby enhancing a strength against vibration on the joint greatly.

3. In this invention, there are no edges produced on the joint portion which bring about the stress concentration to cause the destruction, thereby enhancing the strength against vibration exceedingly.

4. In this invention, the extension 13 provided on the front of the cap nut 12 controls the curl portion 8' at a certain height and therefore the curl portion 8' does not cover the boot groove 2' of the guide pin 2.

As mentioned above, the present invention proposes a friction pressure welding method in which an improvement of a shape for the recess and the cap nut allows to control a projecting height of the curl and enhance the strength against vibration exceedingly.

The friction pressure welding method of the present invention will be utilized not only to the disc brakes but also to the industrial machineries extensively.

What is claimed is:

1. A friction pressure welding method comprising: clamping a pillar-shaped pin in a collet chuck of a friction pressure welding machine, providing a member to be welded to said pin, said member having a recess with an inner diameter larger than an outer diameter of said pin, providing a cap nut on said collet chuck with an extension at a front thereof, rotating and advancing said pin toward and into friction welding contact with said recess in a manner so as to control and to check the flash projection in an axial direction of the pin by engaging a curl portion of the flash projecting from an end surface of said pin with the front of said cap nut such that said curl portion is forcibly pressed onto an inner surface of said recess.

2. A friction pressure welding method as defined in claim 1 wherein said extension provided at said front of said cap nut checks said curl portion of the flash projecting from said pin, thereby controlling a projecting height of said curl portion at a certain level.

* * * * *